United States Patent
Röpke

(10) Patent No.: US 6,583,628 B2
(45) Date of Patent: Jun. 24, 2003

(54) PROCESS AND DEVICE TO DETERMINE MALFUNCTIONING DETECTORS ACTING AS CURRENT SINKS IN A DANGER SIGNALING SYSTEM

(75) Inventor: Gerhard Röpke, Lübeck-Travemünde (DE)

(73) Assignee: Job Lizenz GmbH & Co. KG, Ahrensburg (DE)

( * ) Notice: Subject to any disclaimer, the term of this patent is extended or adjusted under 35 U.S.C. 154(b) by 131 days.

(21) Appl. No.: 09/736,058

(22) Filed: Dec. 13, 2000

(65) Prior Publication Data

US 2001/0011892 A1 Aug. 9, 2001

(30) Foreign Application Priority Data

Dec. 15, 1999 (DE) .......................... 199 60 422

(51) Int. Cl.⁷ .................. G01R 31/08; G01R 31/02; G05B 23/02; G08B 26/00; G08B 29/00
(52) U.S. Cl. .................. 324/523; 324/73.1; 340/3.1; 340/3.51; 340/505; 340/514
(58) Field of Search ............... 324/522, 528, 324/537, 73.1, 523; 340/506, 514, 518, 519, 517, 10.41, 505, 3.1, 3.51

(56) References Cited

U.S. PATENT DOCUMENTS 4,568,919 A * 2/1986 Muggli et al. ........... 340/10.41
5,387,899 A * 2/1995 DiLauro et al. ............ 324/542

FOREIGN PATENT DOCUMENTS

| DE | 25 33 382 | 7/1980 | | |
|---|---|---|---|---|
| DE | 2533382 C2 | * 7/1980 | ................. | 324/523 |
| DE | 33 46 527 | 7/1985 | | |
| DE | 4038992 C1 | * 2/1990 | ................. | 324/523 |
| DE | 40 38 992 | 2/1992 | | |
| DE | 42 12 440 | 10/1992 | | |
| DE | 4 322 841 | 1/1995 | | |
| DE | 4 426 266 | 12/1995 | | |
| EP | 0 111 178 | 6/1984 | | |
| FR | 2319167 A | * 7/1976 | ................. | 324/523 |

* cited by examiner

*Primary Examiner*—N. Le
*Assistant Examiner*—Anjan K. Deb
(74) *Attorney, Agent, or Firm*—Vidas, Arrett & Steinkraus, P.A.

(57) ABSTRACT

A process to determine malfunctioning detectors in a danger signaling system having a control center and at least two-wire signaling line joined to multiplicity of detectors. Control center emits voltage-modulated digital control and interrogation data to the detectors, and the detectors when interrogated by the control center emit current-modulated digital data to the control center; if faulty data are received following an interrogation, control center emits a voltage signal to the detectors for closing the switches of all detectors; the power input of the detectors is measured and saved in a measured-value memory; the control center subsequently provides an impressed current of a preset magnitude to the line; an evaluation device opens the switch if the power input does not exceed a preset measured value and the voltage dropping on a measuring resistor reaches a preset value; the detector next in succession also opens the switch if the voltage dropping on its measuring resistor reaches its preset value and the power input does not exceed the preset maximum to identify the malfunctioning detector.

12 Claims, 3 Drawing Sheets

PROCESS AND DEVICE TO DETERMINE MALFUNCTIONING DETECTORS ACTING AS CURRENT SINKS IN A DANGER SIGNALING SYSTEM

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to a process and device to determine malfunctioning detectors acting as current sinks in a danger signaling system. Danger signaling systems, e.g. fire alarm installations, as a rule, include a major number of danger detectors which are connected to a two-wire signaling line. This one may be conceived as a stub-end feeder or a ring circuit via which the individual detectors communicate with a control centre. Each detector has a sensor or the like which, in dependence on parameters in its bypass, produces measured values which are transferred to the control centre through the line. In order to associate the measured values with the individual detectors, it is necessary to assign an identifier or address to each detector. This one is saved in a non-volatile memory.

From DE 196 34 099 A1, a process for the bidirectional data transfer to a bus between the control centre and the detectors has become known wherein the control centre represents the master and the detectors represent the slaves and the transfer of data sequences from the master to the slaves is effected via an impressed voltage and the slaves, while emitting signals, exhibit the behaviour of current sinks. For an increase in the coverage of transfer from the slaves to the master, a bit-synchronous process is proposed for the data transfer. The document further states that the behaviour of the bidirectional data transfer is of a direction-dependent asymmetry in transfer quality. While the transfer via an impressed voltage from the master to the slaves is effected with no damping as a consequence of the current-reducing behaviour of the slaves and, therefore, is termed to be of a high degree of quality and a low susceptibility to malfunctions and a wide coverage the transfer via an impressed current from the slaves to the master is of a lower quality. Some of the causes are that the data bits undergo significant changes due to the noise in the data transfer channel. As another cause, the capacitance per unit length for the data transfer channel is mentioned, which leads to a power division so that only a fraction of the rise in power generated by the slaves arrives at the master (control centre).

Even more disadvantageous than the aforementioned influences, which mainly can be attributed to the line parameters and can have adverse effects on the quality of data transfer, can heavy current sinks prove to be. A current sink can already be provoked by a detector which has become defective during its long-term service. In view of the huge number of fire detectors which are in continuous operation by day and night, a frequently occurring case for detectors in danger signaling systems, despite all provisions made, it cannot be prevented that an individual component fails in one of the lot of detectors at a non-foreseeable time, specifically following a long period of service. If this component should increase the current flow of the detector by an inadmissible degree in an uninfluenceable, permanent way this can have an annoying effect on the flow of data. The implications which can be imagined are differently intense and may range from the malfunction of only one detector up to the failure of the whole data traffic throughout the signaling line.

In the state of the art, there is a number of differently configured signaling systems. From EP 0 111 178 A1, it has become known to open a series switch by means of an interrogation voltage jump generated by the control centre to a first value and, after a time determined by the state of the detector, to step the series switch through to the next detector by means of another interrogation voltage jump to a second value. These electric signals which correspond to the detector states will be evaluated only within preset ranges of time in the control centre. The ranges of time therebetween are defined as malfunction bands. Signals which are within these malfunction bands cause a respective malfunction message in the control centre. The chain-like step-through also serves for a detection of a short-circuit towards the succeeding detector. The point of the short-circuit may be localized and, hence, the malfunction may be remedied rapidly. In spite of the short-circuit, the complete operating voltage is maintained in the whole signaling line. Only that portion of the signaling line in which the short-circuit exists will be switched off. This document also mentions the use of digital data for the transfer which, however, is refused because its susceptibility to malfunctions.

From DE 33 46 527 A1, a process has become known for an anti-malfunction evaluation of an alarm in a signaling line of a danger signaling system wherein signaling-line states are evaluated in a control centre by means of a window discriminator disposed in the control centre. A disturbance-variable mask-out digital device connected downstream of the window discriminator, upon appearance of the threshold signal, periodically checks over a preset period whether the threshold signal still is applied. Not until this preset time has lapsed an output signal is provided to a detector evaluation device where the test procedure is discontinued once the event disappears and is re-started once a new threshold signal is applied. The known process is unsuitable for a bidirectional digital transfer at a high data frequency.

To achieve a higher reliability of data transfer in danger signaling systems it has been known, from DE 42 12 440 A1 to dispose a transfer malfunction determining system between the control centre and the detector. The transfer of data in the known system is as follows: Emission of access data in the form of a voltage from the control centre through a first transfer line, sending back of reply data of a detector, as is determined in the access data, in the form of an electric current through a second transfer line during a reply time period in which the data sent back from the detector unit which has replied to the access data emitted by the control centre are formed from state data of the detector and check sum data which were compiled by adding the detector state data to the proper address data; the control centre adds the address data to detector state data, a determination is made as to whether a error in transfer has occurred if the data determined by this addition are not in agreement with the check sum data. The known process is intended to primarily aid in preventing a noise in the transfer lines from making itself felt as a malfunction.

From DE 25 33 382 C1, a process for the automatic allocation of detector addresses in a danger signaling system has become known. In this process, the detectors are stepped through in a chain-like manner for the purpose of address assignment wherein the value measured is determined from the delay in time up to the switch-on of the succeeding detector. The step-through is carried out by the switches which are included in the path of a supply line and exist in every detector. The detector address is determined from the value of the preceding rise in line current. Whenever an interrogation cycle begins the detectors are disconnected from the signaling line by a change in voltage.

Finally, from DE 40 38 992 C1, a process has become known for the automatic allocation of detector addresses in danger signaling systems in which each detector has a transfer device, a measured-value memory, an address memory, and a voltage measuring device as well as a switch between the wires of the signaling line. In a first phase, the control centre applies a high voltage to the line, which supplies the detectors with energy by charging a capacitor. In a second phase, a short-circuiting voltage is applied to the line, which causes all detectors the address memories of which are empty to short out the line by means of their switch. In a third phase, a measuring current is impressed into the line and the voltage which will thereby drop on the first detector with its switch closed is determined by the voltage measuring device. Its value is saved in the measured-value memory. In a fourth phase, an interrogation voltage is applied to the line, which causes the detector the measured-value memory of which is occupied, but the address memory of which is empty, to become capable of communication and to be assigned an address by the control centre, which address is saved in the address memory. This operation is repeated often enough until all detectors have been provided with addresses.

From DE 4 426 466 A1, an arrangement has become known for the operation of danger detectors in which the danger detectors are connected to a signaling loop formed as a two-wire primary line of a control centre in a danger signaling system wherein the primary line has disposed at least two disconnecting elements with a signal evaluation and control device and at least one switching element in one of the line wires. Further, limit detectors are provided which do not have an address of their own. The disconnecting elements are designed to be addressed and are disposed in the primary line in such a way that at least three line portions are formed with a respective signaling group and, therefore, a collective address is assigned to each signaling group where the collective address of the detector sounding the alarm is capable of being determined in a case of alarm.

From DE 4 322 841 C2, a danger signaling system has become known, which includes a multiplicity of detectors which are connected, via at least one multi-wire looped circuit common to several detectors, to a control centre cyclically interrogating the detectors from one interrogation end of the looped circuit. The control centre applies a line voltage, which cyclically changes for a chain synchronization of the detectors, to the interrogation end of the looped circuit. Each detector comprises line voltage monitoring means as well as a switch controlled by the line voltage monitoring means in series with one of the wires of the looped circuit wherein the switch closes with a delay following a change in the synchronisation of the line voltage and provides a signaling information pulse to the interrogation end of the looped circuit. The control centre and/or the detectors comprise line malfunction monitoring means responding to wire breakage and/or wire short-circuit of the looped circuit and the control centre interrogates the detector from the two ends of the looped circuit in case of a line malfunction. The control centre, already in the same cycle in which line malfunction monitoring means detect the line malfunction for the first time in case of an interrogation from one of the two interrogation ends, also interrogates the looped circuit from the other of the two interrogation ends. A danger signaling system of this type, in spite of a contingent line malfunction, is supposed to allow for an interrogation of all detectors with no need to extend the stretch of cycle time required therefor.

It is the object of the invention to provide a process to determine malfunctioning detectors acting as current sinks in a danger signaling system which enables to automatically identify a detector which is in a malfunction in such a way.

BRIEF SUMMARY OF THE INVENTION

The invention is based on the fact that the detectors of danger signaling systems usually operate with modulated current and, hence, constitute current sinks. It is to be understood in this case that malfunctions which, in turn, cause current sinks can affect communication already when the malfunction is in the order of the amplitude of the data transferred. Thus, the inventive process is not designed to detect the short-circuit of a detector, for which purpose other, simple processes can be imagined, but to detect those detector malfunctions which mostly occur because of long-term operation and interfere with the communication of data to such an extent that their smooth transfer is no longer possible, at least from the detector to the control centre. If such a malfunction has occurred in a detector in a line it is apparent that any communication with the detectors which are arranged on the side facing away from the malfunctioning detector is no longer satisfactory or also has a malfunction.

Therefore, the inventive process is applicable in a particularly advantageous manner to transfer systems according to the master-and-slave principle. It is to be understood that other transfer systems would be usable as well as far as the detectors of the danger signaling system act as current sinks when in operation.

In the process according to one aspect of the invention, the control centre ascertains that faulty data arrive at the control centre because of an interrogation of a detector. In this case, the control centre emits a voltage signal, which preferably is a voltage-modulated data word, to the signaling line. This causes all detectors to close their switches. The recognition of the respective data word is effected via the measuring resistor and the evaluation unit, which can be constituted by a logic circuit. This one controls the switch, e.g. a FET, and closes it. This causes the signaling line to be short-circuited at the location of each the detector. Subsequently, the control centre impresses the signaling line with a preset current which, however, can only be measured on the nearest detector at hand, i.e. the first detector, via its measuring resistor. Moreover, the power input of the detector is measured. The current rating is saved in a measured-value memory and is compared to a preset maximum current. If the current measured is smaller than the maximum and the impressed current is determined via the measuring resistor the evaluation device generates an opening signal for the switch. This causes a voltage jump which can be evaluated by means of a voltage measuring device in the control centre to the effect that the first detector, as seen from the control centre, has a power input in the admissible range. When the switch is opened in the first detector there will also be a measurable voltage drop in the second detector via its measuring resistor because of the impressed current.

Then, the same operation will be effected as was described for the first detector. However, if the measured current exceeds the maximum the switch will remain closed. The control centre is in a position to ascertain that no further voltage jump has been generated in the signaling line within a certain interval or a certain time. This will then be a sign indicating that there is an inadmissibly large current sink on the detector concerned, which can account for the malfunction of communication in the data traffic between the control centre and the detector.

If the signaling line exists in the shape of a ring circuit the same procedure may now be adopted from the other end of the ring circuit up to the malfunctioning detector. However, if it is an individual stub-end feeder the malfunction test described could be discontinued. However, it can also be imagined, after a preset second period, to give an instruction to open the switch to the detector the switch of which has remained closed. After this, the test procedure described can be performed up to its end or up to another detector which constitutes an inadmissible current sink.

According to an aspect of the invention, additional safety is achieved in the described process if the control centre, following the arrival of faulty data, provides the signaling line with a malfunction information which is inscribed in a malfunction memory of all detectors. Then, if the control centre gives the instruction that all switches should be closed it will be ascertained in the respective detectors whether the malfunction memory is occupied. However, the switch will be closed only if the malfunction memory is occupied.

The above-described process is applicable particularly if communication between the detector and the control centre is in a malfunction, but a transfer of data still is possible in the opposite direction. However, malfunctions can also be imagined in which data traffic is in a malfunction between the control centre and the detector and there is a suspicion that the malfunction is due to an inadmissible current sink. Another aspect of the invention sets forth how to attain the object on the assumption, however, that the supply of the detectors with the electric energy necessary for their operation is not affected. As noted previously, short-circuit incidents may also be detected in another way.

In the process according to another aspect of the invention, a detector provides a malfunction signal to a malfunction memory unless it receives an interrogation signal from the control centre within a preset interval. The operation of danger signaling systems usually is such that the individual detectors are cyclically interrogated for their state and do not arbitrarily send signals to the control centre. Therefore, it is possible, in each detector, to install a circuit which ascertains whether an interrogation has taken place within a preset period. This is easily the case for detectors which include a microprocessor and, hence, may be programmed accordingly. In such case, the detector saves a malfunction signal in its malfunction memory and, if a reply signal is not received, the control centre emits a voltage signal (a data word) by which the malfunction memories of the detectors capable of reception are occupied. This will then cause an occupation all malfunction memories of the detectors in a signaling circuit or an individual stub-end feeder and an identification of the malfunctioning detectors may commence. The control centre generates a voltage signal, e.g. by applying a certain voltage or switching off the supply voltage and switching it on again. This will be interpreted by the detectors to the effect that their switches need to be closed. The further course of the process equals the one according to the first aspect of the invention.

An advantageous circuit arrangement for a danger signaling system for the implementation of the process according to the first and second aspects of the invention is set forth here. By means of danger signaling systems in which the individual detectors exhibit the switches interconnecting the wires of a signaling line, it will also be possible to disconnect detectors acting as inadmissible current sinks from a line. So-called short-circuit disconnectors are known as such. For various reasons, the threshold value to make such short-circuit disconnectors respond cannot be chosen to be so low that malfunctioning detectors which sink an inadmissibly high current are automatically disconnected from the line. Therefore, an aspect of the invention provides that the power input of the detectors be measured and be compared to a setpoint value, in which detectors a malfunction signal is saved in the memory. The control centre may ascertain a malfunction because no reply signal is received as a detector may also ascertain its malfunction or a malfunction in the line if it has not received any interrogation signal within a cycle. If a current rating comparison reveals that the power input of a detector exceeds a preset value a short-circuit will be created between the wires of the signaling line by closing the mentioned switch. The short-circuit is maintained for a time sufficiently long to reach the response threshold value of the short-circuit disconnecting member which then will break at least one of the wires.

According to official regulations, at least 32 detectors are required to be disposed between two successive short-circuit disconnecting members. If a detector acting as an inadmissible current sink in this way is located between two short-circuit disconnecting members a response of the two adjoining disconnecting members is provoked by means of the short-circuit current generated. The capacitor which anyhow exists in the detectors serves as a source of energy for maintaining the switching functions of the detector even following the closure of the switch up to the activation of the two short-circuit disconnecting members.

If a individual stub-end feeder is installed all detectors which are located between the control centre and the first short-circuit disconnecting member opening its switch may be caused to resume the data traffic with the control centre and, hence, to assume their monitoring function. If a detector ring circuit is installed it will even be possible, in case of an incoming supply from two sides, to separate out a line portion each including the detectors interfering with the data traffic, which is located at the incoming-supply ends of the control centre or is located in the intermediate portion of the ring circuit. All line portions with intact detectors may continue to perform their functions or can be caused to do so.

BRIEF DESCRIPTION OF THE SEVERAL VIEWS OF THE DRAWINGS

The invention will now be explained in greater detail with reference to an embodiment shown in the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
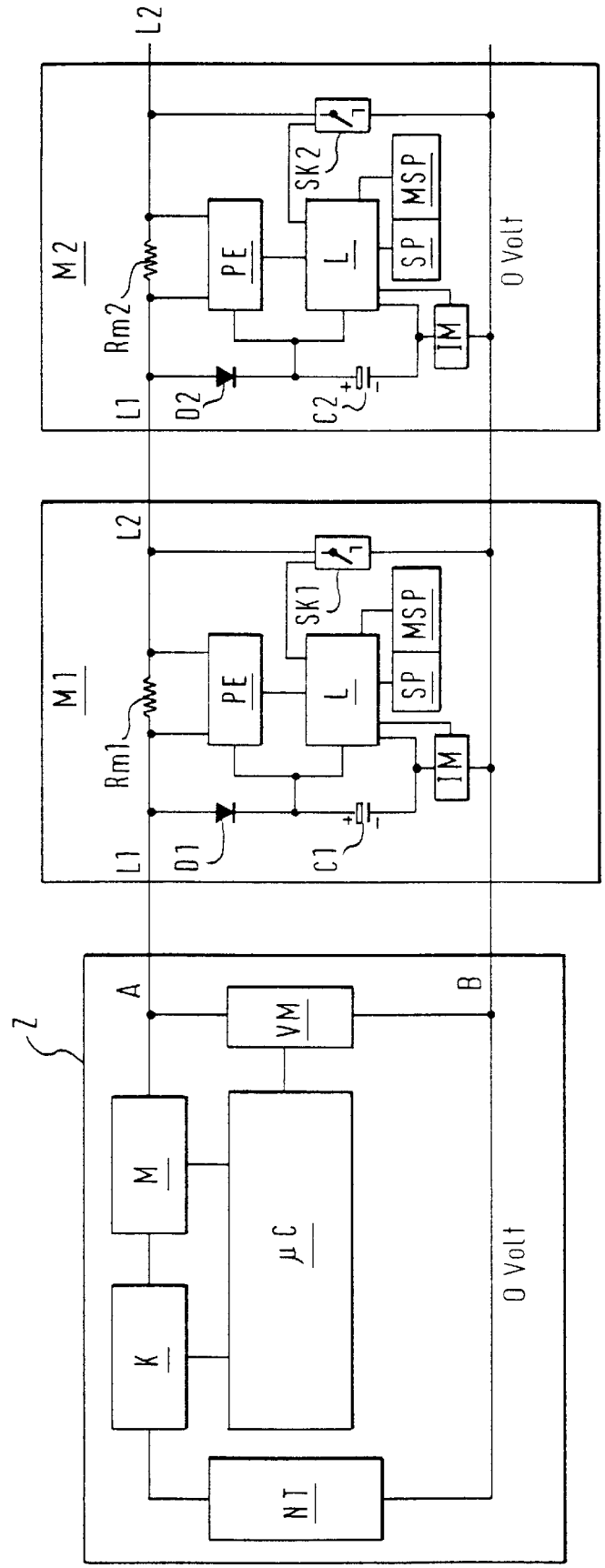
FIG. 1 schematically shows a circuit arrangement of a danger signaling system according to the invention.

Referring to FIG. 1, a control centre Z (12) is illustrated in a danger signaling system, e.g. a fire-alarm installation, to which a transfer line is connected via the wires A (14) and B (16). The transfer line may be a stub-end feeder or a ring circuit as is known as such. The control centre has a voltage supply in the shape of a power supply unit NT (18), a microprocessor $\mu$C (20), a constant-current source K (22), a modulator M (24), and a voltage measuring device VM (26). Reference is made to the function of the individual components farther below.

A multiplicity of detectors, e.g. 128, are connected to the transfer line. However, FIG. 1 merely shows two detectors M1 (30) and M2 (32). Each of them includes a resistor Rm1 (34) and Rm2 (36), respectively, in the course of a wire, a capacitor C1 (38), C2 (40) in series with a diode D1 (42) and D2 (44), respectively, between the wires, a controllable switch SK1 (46) and SK2 (48), respectively, a pulse receiver PE (50), a logic circuit L (52), a malfunction memory SP (54), a measured-value memory MSP (56), and a voltage measuring device IM (58). Each of the latter components is connected to the logic circuit and the switch SK1 is driven by the logic circuit L. The measuring device IM measures the power input of each detector M1, M2. In the practical case, each detector includes a number of further components which are required to operate it. However, detailed reference is not made to these as this is unnecessary for an identification of a malfunctioning detector.

The mode of function of the inventive process will now be explained below with reference to FIG. 1 for the case that communication is in a malfunction between the detectors and the control centre, but not the one from the control centre to the detectors. Because of a process not shown in detail, the control centre Z ascertains that the voltage-modulated data from the control centre Z arrive at the detectors M1, M2 . . . , but the current-modulated data of the detectors M1, M2 are corrupted or, in parts, are not received owing to too high a power input. It is possible to inscribe this malfunction information in the malfunction memory SP via an operation the details of which are not described either and which is known from the state of the art. A current measurement takes place in the measuring device IM, which can be run automatically or following an instruction by the control centre Z. The current rating measured is saved in the measured-value memory MSP by means of the logic circuit L. The control centre Z, by way of a voltage-modulated data word, sends an instruction to the detectors M1, M2 . . . in order that these close their switches SK1, SK2. From now, the capacitor C serves as an energy store for the operation of the components (not shown) and the implementation of the process steps which follow:

Before the switches SK1, SK2 are closed a check is made as to whether the malfunction memories SP are occupied. If this is the case there will be no closure of the switch associated therewith. However, this is a safety precaution which is not generally required. Now, the signaling line is impressed, from the control centre Z, by a current which, however, generates a voltage drop only on Rm1 because the remaining detectors are in a short-circuit. The current can be measured via the pulse receiver PE and its information is sent on to the logic circuit L. The logic circuit now ascertains whether a current is measured and, in addition, whether the current rating measured which is saved in the measured-value memory MSP is below or above a programmed maximum current rating. If the current rating measured is below the maximum value the logic circuit L will open the memory SK1 associated therewith. This causes the control centre Z to experience a voltage jump which can be evaluated by means of the voltage measuring device VM to the effect that the first detector M1 has a power input within the admissible range. Opening the switch SK1 will now generate a measurable voltage via the resistor Rm2. In this case, if the current rating measured saved in the memory MSP is found to exceed a maximum the logic circuit L does not generate any signal to open the switch SK2 and, hence, any voltage jump on the terminals of the control centre Z. This can be evaluated by the control centre Z to the effect that the second detector SK2 constitutes an inadmissible current sink and, thus, the cause of the malfunction of communication in the data traffic.

If no further provision is made this completes the test procedure. However, it can also be imagined that the switch SK2 be opened, after the lapse of another stretch of time, by means of an instruction proceeding from the control centre Z, according to which the further detectors may then be tested in the manner described. Thus, a malfunctioning detector may clearly be identified as an inadmissible current sink by a count of the voltage jumps in the control centre.

If communication from the control centre to the detectors is out of order as well, but supply with a voltage is maintained, the following process is employed. In fact, this process may be employed as an alternative to the first process described or may be employed additionally.

By means of an appropriate circuit, e.g. that of a microprocessor, in the detectors M1, M2 . . . , it can be ascertained whether the detectors receive interrogation signals from the control centre Z according to a preset cycle. If this is not the case because of the malfunctioning communication a malfunction signal is saved in the malfunction memory SP. Furthermore, the current is also measured and saved in the measurement memory. In spite of generating an interrogation signal, the control centre Z does not receive any reply from the detector concerned and concludes therefrom that there is a malfunction. Now, the control centre Z provides a data word to the line. This will then occupy all malfunction memories which were not yet occupied before. Subsequently, a voltage signal is generated by the control centre. This can also be accomplished in a way that the supply voltage is turned off and is turned on again. This will be interpreted by the detectors to the effect that their switches SK1 need to be closed. Upon completion of this operation, the control centre generates an impressed current again and the test procedure runs in the same way as has been described above.

Figure 2:
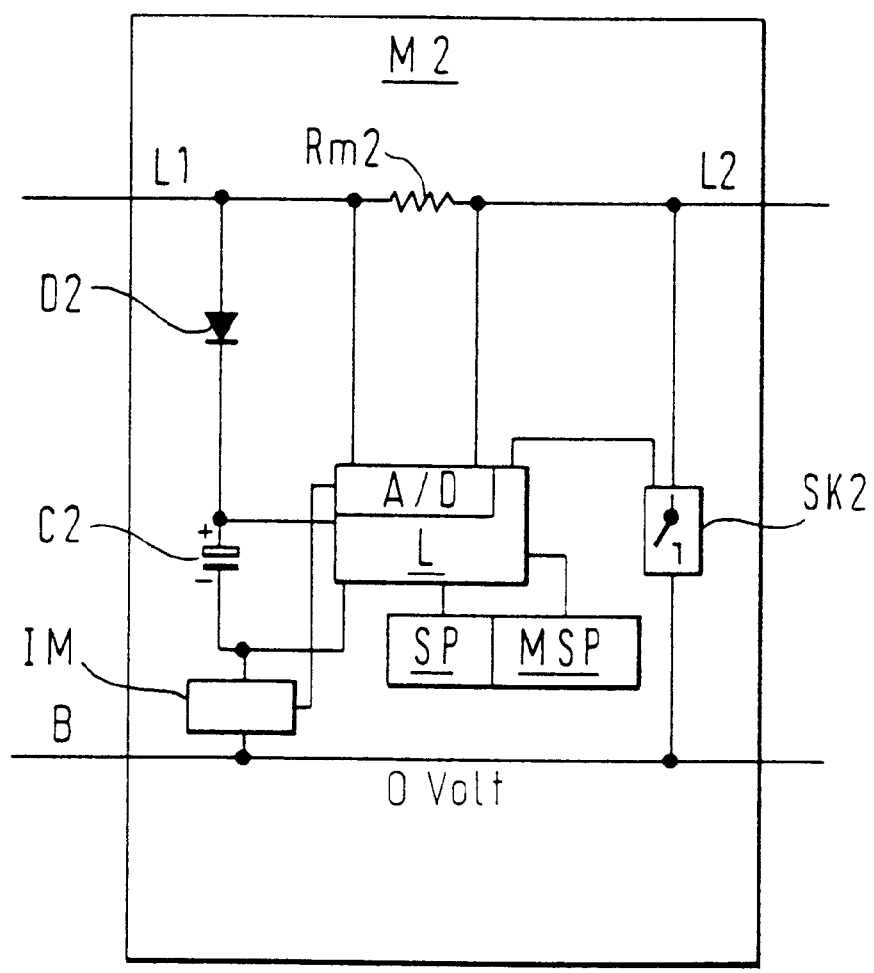
FIG. 2 shows another embodiment of a signaling structure of the danger signaling system of FIG. 1.

Referring to FIG. 2, a detector is shown which substantially has the same components as the detectors M1 and M2 of FIG. 1. As can be seen, a logic circuit switch L (60) is illustrated in lieu of the pulse receiver PE, with an integrated A/D converter (62). The "components" shown here are those of a microprocessor which commonly is installed in the detector and the A/D converter of which and the program of which compare the voltages dropping on the measuring resistor to preset digital values. The data word ensuing therefrom is interpreted accordingly.

Figure 3:
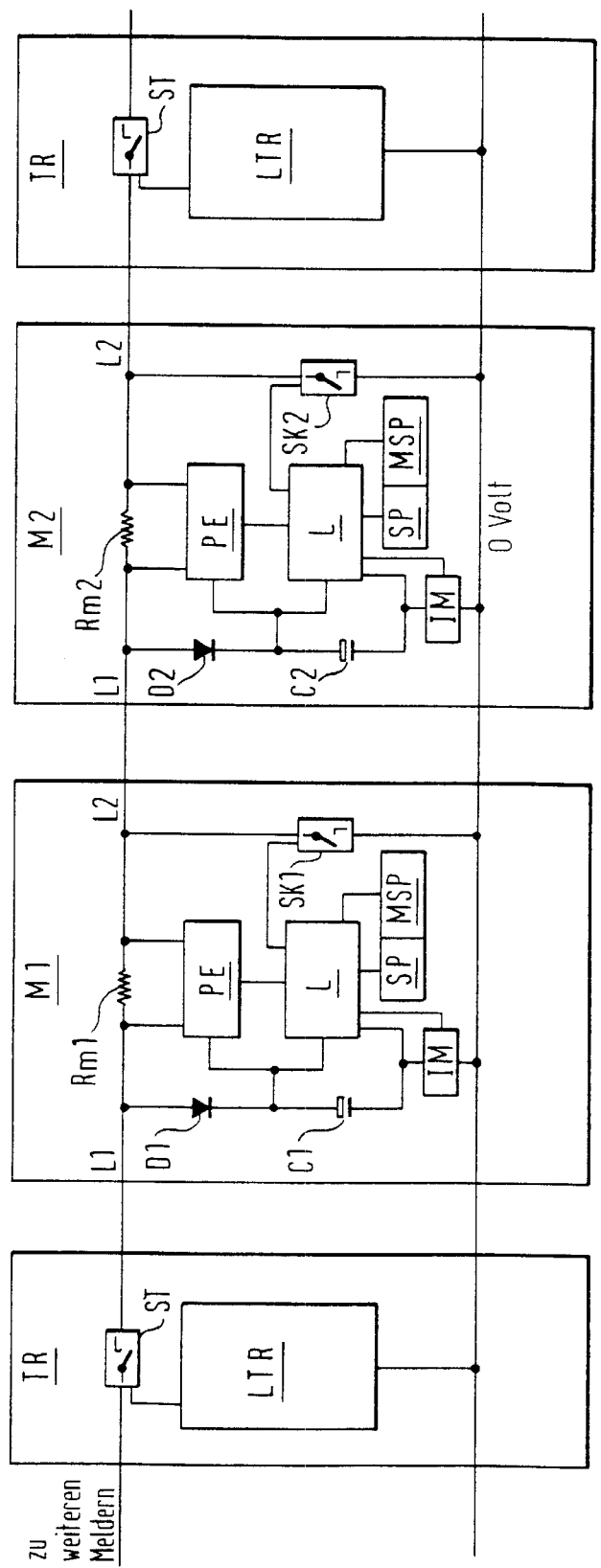
FIG. 3 shows a signaling structure similar to that of FIG. 1, but including short-circuit disconnecting members between a number of detectors each.

Referring to FIG. 3, the control centre has been omitted. The individual detectors M1, M2, in their structure, correspond to the detectors M1, M2 in FIG. 1. Therefore, no further detailed reference will be made thereto here.

As can be seen, two disconnecting members TR (64) are disposed on the two sides of the chain M1, M2 wherein, however, a number of 32 detectors can be disposed between the disconnecting members. Each disconnecting member TR has a switch ST (66), which is arranged in the wire A of the signaling line. Naturally, a switch can only be provided either in the wire B or also in both wires. Moreover, each disconnecting member includes a circuit component LTR (68) which will respond if the current in the wire exceeds a preset rating, which will then cause the switch ST to be opened.

If the control centre or a detector M ascertains that there is a malfunction in communication (see the examples given above) a corresponding malfunction signal is saved in the malfunction memory SP. In addition, a current measurement is effected via the current measuring device IM. By the way, the current measurement may also be caused by the control centre. If the logic circuit finds out that the rating measured for the power input exceeds a preset maximum the switch SK1 or SK2 is closed and a short-circuit current will flow in the line and, in any case, will reach the threshold value of the disconnecting members TR. Hence, these will separate out the detected portion lying between them from the line, after which the remaining portions may continue to be operated. The capacitor which anyhow exists in the detectors serves as a source of energy in order to maintain the switching functions of the detector even after the closure of the switch up to the activation of the two short-circuit disconnecting members.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A process to determine malfunctioning detectors acting as current sinks in a danger signaling system which comprises a control centre and at least a two-wire signaling line joined thereto to which a multiplicity of detectors is connected wherein each detector as a capacitor for energy storage, a measuring resistor interposed in a wire, an evaluation device analyzing the voltage drop on the measuring resistor, an address memory, and a switch adapted to be controlled by the evaluation device between the wires, comprising the following process steps:
   the control centre cyclically emits voltage-modulated digital control and interrogation data to the detectors, and the detectors when interrogated by the control centre emit current-modulated digital data to the control centre;
   if faulty data are received following an interrogation by the control centre this one emits a voltage signal to the detectors for closing the switches of all detectors,
   the power input of the detectors is measured and saved in a measured-value memory before, simultaneously or afterwards;
   the control centre subsequently provides an impressed current of a preset magnitude to the line;
   the evaluation device opens the switch if the power input does not exceed a preset measured value and the voltage dropping on the measured resistor reaches a preset value;
   the detector next in succession also opens the switch if the voltage dropping on its measuring resistor reaches its preset value and the power input does not exceed the preset maximum, etc.;
   the control centre determines the detector the switch of which has remained closed at least temporarily.

2. The process according to claim 1, characterized in that the voltage signal is of a modulated voltage.

3. The process according to claim 1, characterized in that the control centre determines the voltage jumps in opening the detector switches and identifies a malfunctioning detector by its failure to effect a voltage jump after the last voltage jump within a preset first period.

4. The process according to claim 3, characterized in that the control centre, upon the lapse of the first period, generates an instruction to open the switch of the detector found to be in a malfunction after a preset second period.

5. The process according to claim 1, characterized in that the control centre, upon the arrival of faulty data, inscribes a malfunction information in a malfunction memory of all detectors, and that the switch will be opened only if the malfunction memory of the detector concerned is occupied.

6. A circuit arrangement to determine malfunctioning detectors acting as current sinks in a danger signaling system to carry out the process according claim 1, comprising:
   a control centre (Z) which includes a voltage supply (NT), a microprocessor ($\mu$C), a constant-power source (K), a modulator (M), and a voltage measuring device (VM);
   a multiplicity of detectors (M1, M2 . . . ), which are connected to a two-wire detector line (A, B) joined to the control centre (Z) wherein:
      each detector (M1, M2) has a capacitor (C1, C2) connected in series with a diode (D1, D2 . . . ) between the wires (A, B), a switch (SK1, SK2) adapted to be controlled between the wires (A, B), a measuring resistor (Rm1, Rm2) disposed in series with a wire (A), a pulse receiver (PE) connected to the measuring resistor (Rm1, Rm2), and a logic circuit (L), wherein a current measuring device (IM), a malfunction memory (SP), and a measuring memory (MSP) as well as the pulse receiver (PE) and the switch (SK1, SK2) are joined to the logic circuit (L).

7. The circuit arrangement according to claim 6, characterized in that a semiconductor switch, preferably a FET, is provided as a switch and the ratio of resistance from the measuring resistor (Rm1, Rm2 . . . ) to the resistance value of the stepped-through semiconductor switch is larger than 10:1.

8. The circuit arrangement according to claim 6, characterized in that the detector (M1, M2) includes a microprocessor and the pulse receiver is constituted by the A/D converter and the program of the microprocessor.

9. A process to determine malfunctioning detectors acting as current sinks in a danger signaling system which comprises a control centre and at least a two-wire signaling line joined thereto to which a multiplicity of detectors is connected wherein each detector has a capacitor for energy storage, a measuring resistor interposed in a wire, an evaluation device analyzing the voltage drop on the measuring resistor, an address memory, and a switch adapted to be controlled by the evaluation device between the wires, comprising the following process steps:
   the control centre cyclically emits voltage-modulated digital control and interrogation data to the detectors, and the detectors when interrogated by the control centre emit current-modulated digital data to the control centre;
   the detector saves a control signal in a malfunction memory if it does not receive any interrogation signal from the control centre within a preset interval;

if no reply signal is received from a detector the control centre emits a voltage signal (a data word) by which the malfunction memories of the detectors capable of reception are occupied;

the detectors measure their power input and compare it to the preset maximum;

the control centre generates a voltage signal for closing the switches of all detectors with only the switches of the detectors being closed;

the control centre subsequently provides an impressed current of a preset magnitude to the line;

the evaluation device opens the switch if the power input does not exceed a preset maximum and the voltage dropping on the measuring resistor reaches a preset value, the detector next in succession also opens the switch if the voltage dropping on its measuring resistor reaches its preset value and the power input does not exceed the preset maximum, etc.;

the control centre determines the detector the switch of which has remained closed at least temporarily.

10. The process according to claim 9, characterized in that the voltage signal is generated by turning the supply voltage off and turning it on again.

11. A circuit arrangement to determine malfunctioning detectors acting as current sinks in a danger signaling system to carry out the process according claim 9, comprising:

a control centre (Z) which includes a voltage supply (NT), a microprocessor ($\mu$C), a constant-power source (K), a modulator (M), and a voltage measuring device (VM);

a multiplicity of detectors (M1, M2 . . . ), which are connected to a two-wire detector line (A, B) joined to the control centre (Z) wherein:

each detector (M1, M2) has a capacitor (C1, C2) connected in series with a diode (D1, D2 . . . ) between the wires (A, B), a switch (SK1, SK2) adapted to be controlled between the wires (A, B), a measuring resistor (Rm1, Rm2) disposed in series with a wire (A), a pulse receiver (PE) connected to the measuring resistor (Rm1, Rm2), and a logic circuit (L), wherein a current measuring device (IM), a malfunction memory (SP), and a measuring memory (MSP) as well as the pulse receiver (PE) and the switch (SK1, SK2) are joined to the logic circuit (L).

12. A process to disconnect malfunctioning detectors acting as current sinks in a danger signaling system which comprises a control centre and at least a two-wire signaling line joined thereto to which a multiplicity of detectors is connected wherein each detector has a capacitor for energy storage, a measuring resistor interposed in a wire, an evaluation device analyzing the voltage drop on the measuring resistor, an address memory, and a switch adapted to be controlled by the evaluation device between the wires, comprising the following process steps:

the control centre cyclically emits voltage-modulated digital control and interrogation data to the detectors, and the detectors when interrogated by the control centre emit current-modulated digital data to the control centre;

if faulty data are received following an interrogation by the control centre this one emits a voltage signal (a data word) to the detectors for memorizing it as a malfunction signal in a malfunction memory;

the power input of the detectors is measured and saved in a measured-value memory before, simultaneously or afterwards;

the switch of the detector the malfunction memory of which is occupied and the power input of which exceeds a maximum is closed for the generation of a short-circuit current between the wires;

the short-circuit current activates at least one short-circuit disconnecting member which breaks at least one wire of the signaling line.

* * * * *